Dec. 19, 1950     L. L. SPRAKER     2,534,481
ADJUSTABLE CORN PICKER SNOUT
Filed April 22, 1948     2 Sheets-Sheet 1
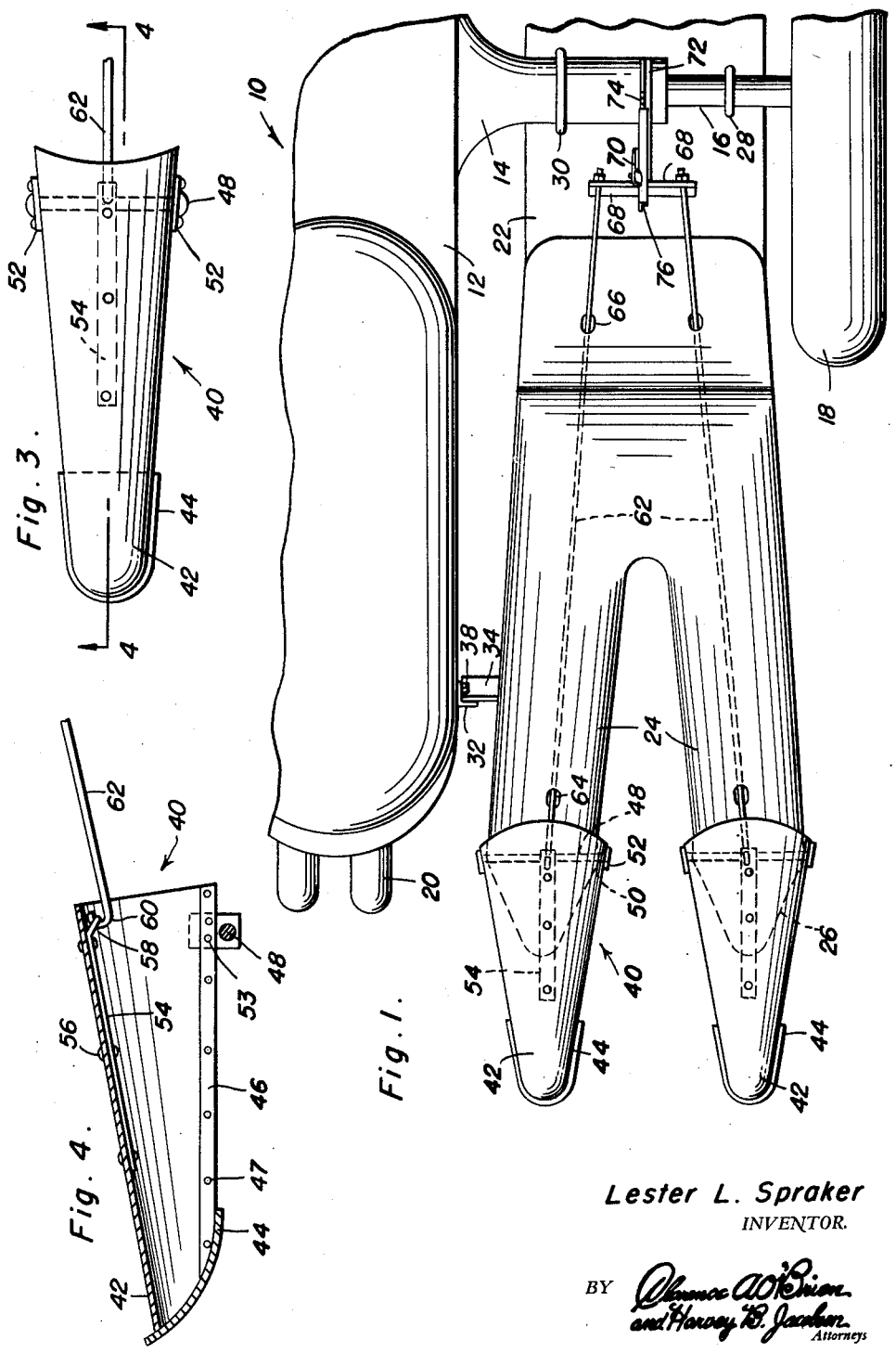
Lester L. Spraker
INVENTOR.

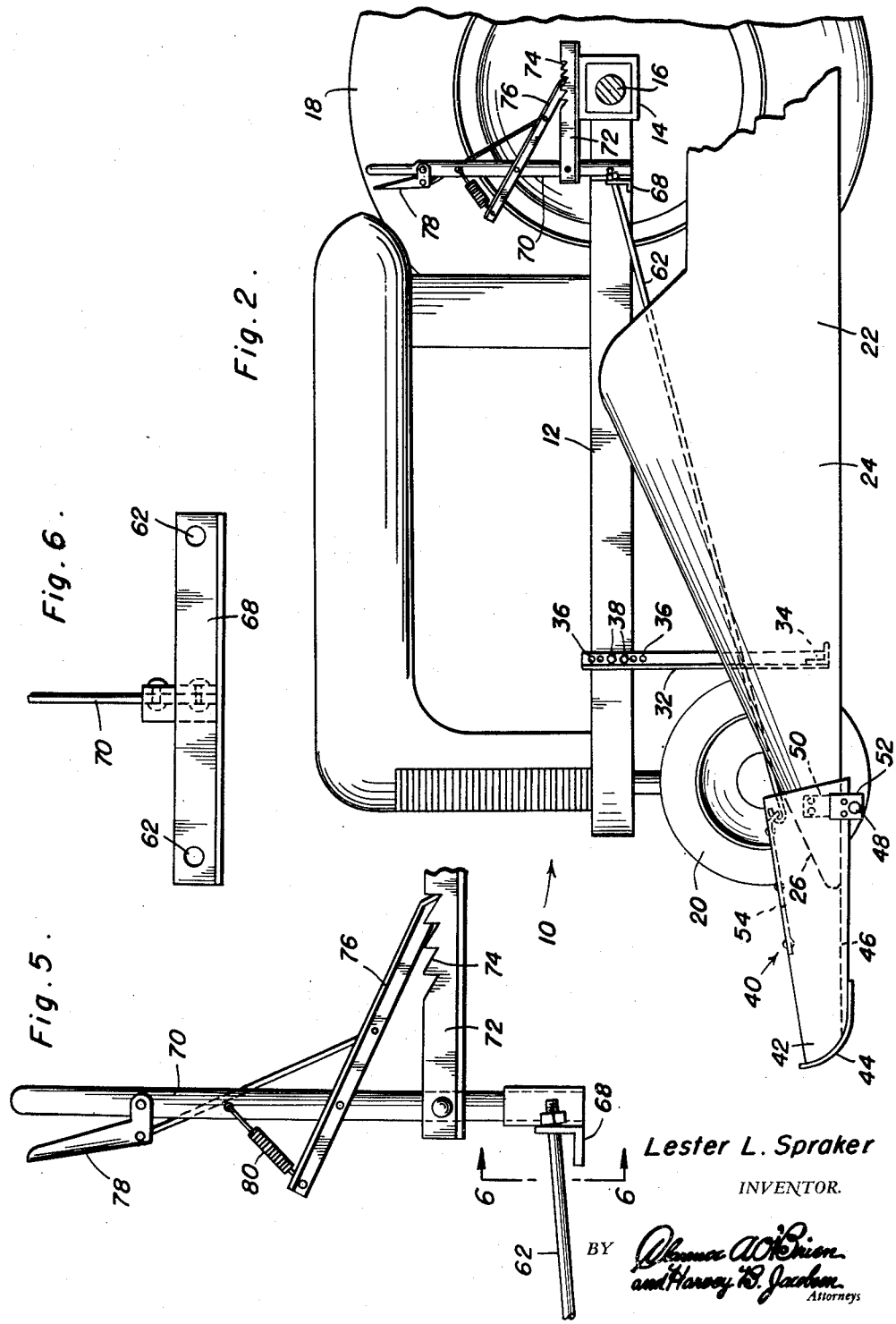

Patented Dec. 19, 1950

2,534,481

UNITED STATES PATENT OFFICE 2,534,481

ADJUSTABLE CORN PICKER SNOUT

Lester L. Spraker, Eaton, Ohio

Application April 22, 1948, Serial No. 22,692

1 Claim. (Cl. 56—119)

This invention relates generally to corn pickers, and more particularly to a corn picker snout assembly for use with a corn picker mounted on a tractor.

A primary object of this invention is to provide means whereby the corn picker may be more rigidly secured on the tractor than have conventional corn pickers been secured heretofore, while allowing for vertical adjustment of the forward end of the corn picker, and adjustable snouts are pivotally mounted on the said forward end of the corn picker, so that corn stalks and ears positioned near the ground or on the ground may be gathered by the picker, the said adjustable snout being preferably located well in front of the front wheel or wheels of the tractor, whereby a higher percentage of the total crop is harvested.

Another object of this invention is to provide corn picker snouts of improved design and which will operate with a higher efficiency than the snouts provided heretofore on corn pickers, these improved snouts including skid plates on the front end thereof and having wear plates extending longitudinally along the lower edges thereof.

Still another object of this invention is to design a corn picker snout which may be secured to differently shaped and proportioned corn pickers with a minimum amount of special adaptation.

And a last object to be mentioned specifically is to provide a corn picker snout assembly which is relatively inexpensive and practicable to manufacture, which is extremely simple to install and to use, which makes provision for control by levers positioned near the operator of the tractor on which the corn picker is mounted, and which will give generally efficient and durable service.

With these objects definitely in view, this invention resides in certain novel features of construction, combination and arrangements of elements and portions as will be hereinafter described in the specification, particularly pointed out in the appended claim and illustrated in the accompanying drawings which form a material part of this application, and in which:

Figure 1 is a fragmentary top plan view of a portion of a tractor with this invention incorporated on a corn picker which is also fragmentarily shown as mounted upon the tractor;

Figure 2 is a left hand side elevational view, of fragmentary character, of the tractor illustrated in Figure 1;

Figure 3 is a top plan view of the adjustable snout and a portion of a link used to control the same;

Figure 4 is a vertical longitudinal sectional view of this snout, this view being taken substantially on the section line 4—4 and looking in the direction of the arrows in Figure 3;

Figure 5 is an enlarged view of the control lever assembly; and

Figure 6 is a view of a cross bar structure carried by the lower end of the control lever and associated with the said links.

Similar characters of reference designate similar or identical elements and portions throughout the specification and throughout the several views of the drawings.

Referring now the drawings in detail, this invention is adapted to be used with an environment including a tractor generally indicated by the numeral 10 and having a frame 12, an axle housing 14, an axle 16 and rear wheels 18 and front wheels 20.

The corn picker fragmentarily shown in Figures 1 and 2 will ordinarily be duplicated on the other side of the tractor, it being thought unnecessary to illustrate this duplicated structure. The corn picker on each side of the tractor has a snout assembly including a bifurcated member 22, the arms 24 of which are pointed as at 26 at their front end. The corn picker is pivotally mounted by means of U-members 28 and 30 to the axle 16 and to the axle housing 14, according to conventional practice, and the forward ends of the arms are adjustably mounted on the frame 12 by the depending angle iron members 32, together with horizontal members 34 which may be welded to the lower ends of the depending members 32 and to the adjacent portions of the inner of each pair of arms 24 on each side of the machine.

In order to make the pickers adjustable, each depending member 32 is provided with a plurality of apertures 36 to receive headed bolts 38 which are screwed into threaded holes in the frame 12. Snouts, generally indicated by the numeral 40, are each of similar design, being of inverted U-shape in cross section and pointed at their forward ends 42. Skid plates 44 are welded or otherwise rigidly mounted on the front ends 42, and wear plates 46 are riveted or welded or bolted, as indicated at 47, to the lower longitudinal edges of each snout 40. These wear plates 46 extend throughout the major portion of the length of each snout and constitute a reinforcing means as well as wear plates.

Pivotally secured to the forward ends of the arms 24 by transversely disposed axis pins 48, these snouts are shiftable so that the forward ends 42 thereof may be raised and lowered. The axis pins 48 are inserted through apertured supporting plates 50 on the arms 24 and are terminally secured to other supporting plates 52 welded or otherwise secured, as indicated at 53, on the lower edges of the snouts, the wear plates 46 serving to make the attachment of the plates 52 more rigid.

The reinforcing strap 54 is riveted or otherwise secured, as at 56, on the upper portion of each snout and the rear end 58 of this strap is bent downwardly and apertured to receive a hook end 60 of a link 62 which will be of inflexible rod character. The links 62 extend through apertures 64 and 66 in the forward and rear upper part of the arms 24 and these links traverse the arms interiorly so as to avoid contact with the stalks of corn passing over the upper portions of these arms.

The rear ends of the links 62 are adjustably connected to the cross bar 68, preferably of angle iron structure, which is carried by the lower end of a lever 70, and this lever is pivoted on the member 72 secured to any suitable fixed structure such as the axle housing 14. A member 72 will, of course, carry a single lever 70 and this single lever will control a pair of links 62 and the corresponding pair of adjustable snouts. The member 72 may be provided with a toothed rack portion 74 and the lever 70 may have a spring biased lug 76 with suitable means for releasing the same, as indicated at 78, the spring associated therewith, being indicated at 80.

From the foregoing it will be clear that a very practical and satisfactory corn picker snout assembly has been provided which will allow the arms 24 to be adjusted to a height above the ground higher than in conventional machines, with the obvious beneficial result that the corn picker per se will not be as likely to become damaged, while the adjustable snouts allow the corn to be satisfactorily gathered from positions on or near the ground. It will be understood that the snout may be of considerable length and will project preferably well ahead of the front wheels 20 of the tractor so that these wheels have no opportunity to mash the fallen stalks of corn into the ground before the adjustable snouts raise the same into the corn picker. The whole assembly may, of course, be adjusted by removing the headed bolt 38 and raising or lowering the depending member 32 and thereafter reinserting the headed bolt through the apertures 36 when the depending member is at the correct position.

The general operation of the machine will be clearly understood by those skilled in agricultural pursuits, when this description is taken in connection with the drawings and with the recitation of objects thought to be achieved by this invention. Obviously many minor variations may be made in the exact structural details and the proportionment of the various elements of this invention without departure from the spirit thereof, which scope should be determined only as limited by a proper interpretation of the terminology used in the subjoined claim.

Having described the invention, what is claimed as new is:

A corn picker snout assembly for use with a corn picker mounted on the frame of a tractor, comprising a bifurcated member having the arms thereof pointed toward the front of the tractor, means for adjustably securing said member on the frame of a tractor so that the arms are at a predetermined height above the ground, snouts mounted on said arms for pivotal movement, and means for pivotally shifting said snouts together, said means comprising a lever pivoted on said frame of the tractor, and inflexible links secured to and between said lever and said snouts, said arms being hollow and having apertures on the upper portions thereof adjacent their front and rear ends, and said links being inserted through said apertures and interiorly traversing said arms.

LESTER L. SPRAKER.

REFERENCES CITED

The following references are of record in the file of this patent:

UNITED STATES PATENTS

| Number | Name | Date |
| --- | --- | --- |
| 681,147 | Stone | Aug. 20, 1901 |
| 1,852,702 | Coultas et al. | Apr. 5, 1932 |
| 1,878,941 | Lindgren | Sept. 20, 1932 |
| 1,900,806 | Evenson | Mar. 7, 1933 |
| 1,940,851 | Everett et al. | Dec. 26, 1933 |
| 2,284,909 | Kuhlman | June 2, 1942 |